Aug. 18, 1936.　　　C. H. HAGOPIAN　　　2,051,211
FAUCET CONNECTION
Filed Dec. 20, 1935
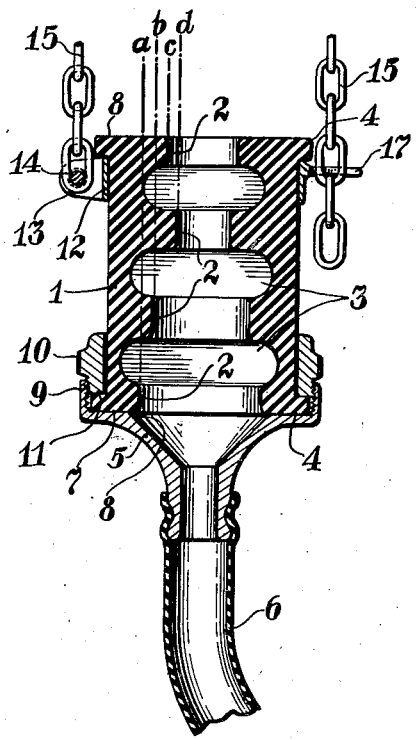
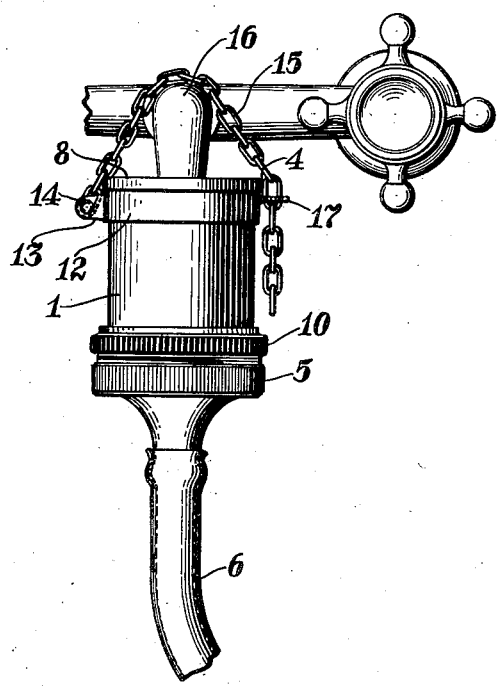
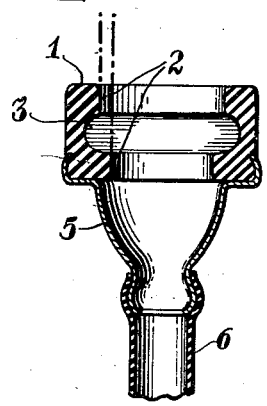
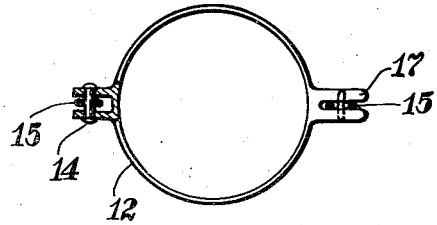
INVENTOR
Charles H. Hagopian
BY
PAUL A. TALBOT.
ATTORNEY Patented Aug. 18, 1936

2,051,211

UNITED STATES PATENT OFFICE 2,051,211

FAUCET CONNECTION

Charles H. Hagopian, New York, N. Y.

Application December 20, 1935, Serial No. 55,420

2 Claims. (Cl. 285—90)

My invention relates to connections for faucets in which the elasticity of a flexible body having a plurality of internal varying diameters is employed to engage faucets of varying diameters to form a water tight joint and has for some of its objects to provide:

A connection which may be made tight for faucets of a wide range of sizes without the use of threaded connections to the faucet.

A rubber or similar body to suit various sizes of faucets for attaching a spray tube for showers and the like.

A connection for shower tubes which may be quickly applied without tools to faucets having a wide range of sizes.

A faucet connection which may be easily attached to bath tub tap outlets by any one without mechanical skill or experience.

A reversible flexible connection for faucets of varying sizes.

I accomplish these and other objects by the construction herein described and illustrated in the accompanying drawing forming a part hereof in which:

Figure 1 is a vertical section of my device.

Figure 2 is an elevation showing the application of my device.

Figure 3 is a section of a modification of my device.

Figure 4 is a plan view of the chain ring.

Similar reference characters refer to similar parts throughout the several views of the drawing and in the following specifications which describe my invention as succinctly set forth in the appended claims.

My device preferably comprises a body (1) of rubber or other flexible material having an internal diameter of varying dimensions here shown as providing four inwardly projecting reductions, or gripping seats (2) having three enlarged chambers (3) between the seats. Each of the seats is suitable to engage the end of a faucet having a slightly larger diameter than the internal diameter of the seat most suitable to engage it thus permitting the body (1) to be forced over the end of the faucet by reason of the elasticity of said body.

The exterior of said body (1) is substantially straight throughout its length except at each end where I have provided an outwardly projecting flange (4) each substantially of the same external diameter and thickness to facilitate either end of the body to be clamped and held tight to the substantially rigid outlet member (5) which may be of metal, compressed fibre or other material best suited to the use required to connect my body (1) to the hose or tube (6) the upper end of the member (5) is provided with the seat (7) against which either end surface (8) of the body (1) may be clamped to form a water-tight joint with the member (5). The threads (9) of the member (5) preferably engage the threaded ring (10) which is of slightly larger internal diameter than the exterior of the body (1) but of substantially smaller diameter than the flange (4) which is compressed between the surface (11) of said ring (10) and the seat (7). By inverting or turning the body (1) upside down the number of seats and thus the number of faucet sizes may be connected to is doubled, making its use practically universal.

Both the ring (10) and the ring (12) may be easily forced over the flanges (4) by compressing the flexible body at its ends sufficiently to slip said rings over the flanges. The ring (12) is preferably provided with lugs (13) and pin (14) which engages one of the links of the chain (15) which may be drawn tightly over the faucet (16) and then secured in place by placing one of the links of the chain (15) into engagement with the forked lug (17) diametrically opposite from the lugs (11) of the ring (12). My device is thus held from being forced off of the end of the faucet when the pressure is sufficient to overcome the gripping capacity of the body (1). Experience has shown that the chain is seldom required to secure my device to the faucet but for shower tubes the operator may desire the chain to prevent pulling my connection from the faucet due to rough use.

The seats (2), it may be seen by referring to the broken lines of Figure 1, are four in number, each being of a different diameter, (a) being the largest and (b) the next in size are downward and not in position to be used as a connection to the faucet and it is necessary to turn the body (1) upside down from the position shown in Figure 1 to use the sizes (a) and (b). The rings (10) and (12) are also reversed in position to suit my device to large faucets.

Depending on the size of the end of the faucet to which my device is secured either seat size (c) or (d) may be used and when inverted either size (a) or (b) may be used.

In the modification shown in Figure 3 only two seats are shown and the body (1) is vulcanized into the rigid outlet member (5) of sufficient diameter at its top to receive the body (1) and reduced at its lower end to which a hose or tube may be secured, the lower end entering the hose in the conventional manner.

My device may be modified both as to size and the number of gripping seats and the details herein described and shown may be modified to best suit its application to various types of faucets within the scope of the appended claims which succinctly set forth my invention.

I claim:—

1. In a faucet connection, a flexible body having a plurality of faucet gripping seats, a rigid member having its upper end of sufficient diameter to receive said flexible body, flanges at each end of said flexible body whereby either end of said body may be made tight to said rigid member, and a ring engaging threads in said rigid body to clamp said flanges of said flexible body between said ring and said rigid member, a chain and a ring slidably engaging the exterior of said flexible body and one of said end flanges, said ring having lugs diametrically on its opposite sides whereby said chain may be placed over said faucet to prevent said flexible body from being forced out of engagement with said faucet.

2. In a faucet connection, a rigid member suitable to enter and connect a hose at its lower end, a flexible body having a plurality of gripping seats each seat a different internal diameter suitable to grip faucets each larger in diameter than one of said seats each seat suitable to make a pressure-tight joint to the faucet and means detachably securing said rigid member to said flexible body whereby said flexible body may be turned upside down and secured to said rigid member to double the number of seats available to engage the faucets.

CHARLES H. HAGOPIAN.